Jan. 4, 1966  C. E. CADY  3,227,066

EGG SHAPER

Filed Aug. 19, 1963

INVENTOR.
CLARENCE E. CADY
BY

_United States Patent Office_

3,227,066
Patented Jan. 4, 1966

3,227,066
EGG SHAPER
Clarence E. Cady, 723 S. 27th St., Omaha, Nebr.
Filed Aug. 19, 1963, Ser. No. 303,107
1 Claim. (Cl. 249—58)

This invention relates to a device for shaping an egg prior to and during the cooking of the egg, and more particularly it is an object to provide an egg shaping device having an annular side wall for confining the white portion of an egg and further having an annular yolk positioning baffle through which the egg can be dropped, the device further having its baffle provided with inclined upper portions for causing an egg to be funneled through the baffle and downwardly to a skillet.

A further object is to provide the yolk positioning baffle with a size considerably lesser than the size of the annular white retaining side wall, so as to position the yolk in an exact location.

A further object is to provide an egg shaping device as above described in which the yolk positioning baffle can be placed either at the center of the outermost annular side wall, or at other positions if desired.

An object of the invention is to provide means making it possible to cook eggs in more eye-appealing, uniform and delightful shapes than has been heretofore possible.

Still another object is to provide means for making it possible to serve eggs in a shape recognizable.

A further object is to provide an egg shaping device which can be made of many shapes for making it possible to serve eggs in a wide variety of pleasing, unique and novel ways, to the credit of either the housewife or the restaurant proprietor.

Still another object is to provide an egg shaping device as described which is provided with opening means through its upper portion through which the white of an egg can be seen for the purpose of determining whether or not the egg has yet been sufficiently cooked.

Another object is to provide an egg shaping device provided with means engageable by a spatula or kitchen knife or the like for facilitating the removal of the egg shaping device when desired.

Other and further objects and advantages of the present invention will be apparent from the following detailed description, drawings, and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
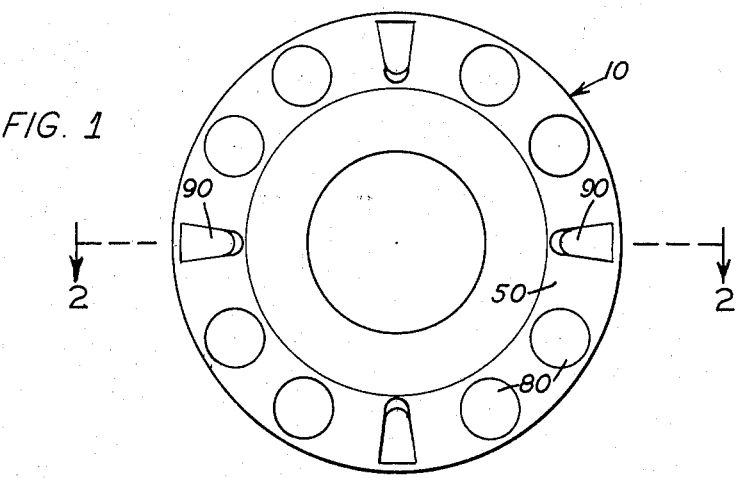
FIGURE 1 is a top plan view of the egg shaping device of this invention.
Figure 2:
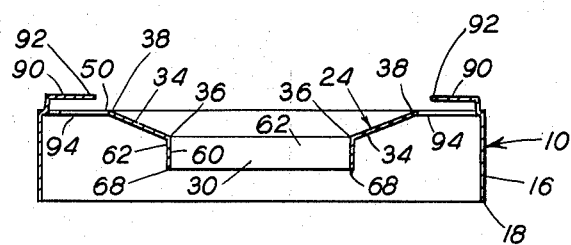
FIGURE 2 is a sectional view as seen along the line 2—2 of FIG. 1.

Referring to the drawing and more particularly to FIGURES 1 and 2, an egg shaping device is there shown and generally indicated at 10, comprising an annular upwardy extending side wall 16 having a lower edge 18 of a shape sufficiently close to planar as to retain an egg when the egg is resting on a horizontal flat top of a skillet.

Spaced inwardly from the side wall 16 is a yolk positioning baffle 24 of annular shape for defining a vertical egg receiving hole 30.

The baffle 24 having a first or upper annular portion 34, all sides of which incline downwardly at their innermost portions 36 from upper outermost portions 38 so as to funnel an egg downwardly toward the hole 30.

The yolk positioning baffle 24 is further provided with suspending means in the form of a suspending wall or connecting wall 50, connecting the baffle 24 at the uppermost parts 38 of its inclined portion 34 with the annular outwardly extending side wall 16 so as to suspend the baffle 24 sufficiently spaced above the lower edge 18 of the outer side wall 16, as to permit an egg to be received and to be fried under the baffle 24 at times when the egg as well as the under edge 18 of the outer side wall 16 are both rested upon a skillet or other cooking surface of a generally flat or horizontal nature.

The baffle 24 has two portions, the inclined or upper portion 34 has already been described. The lower portion of the yolk positioning baffle 24 is shown best in FIGURE 2 at 60 and it is of annular shape, having an uppermost portion 62 connected to the lowermost part 36 of the upper or funnel or inclined baffle portion 34 for suspension therefrom.

The lower annular baffle portion 60 has a lower edge 68 which is disposed in horizontal plane spaced a distance upwardly from the lower edge 18 of the outer side wall 16 a desirable distance so as to permit an egg to be received between the lower edge 68 and the plane of the lower edge 18, with the exception that the yolk of the egg be at least partially received above the lower edge 68, and still more preferably with the outer periphery of the yolk of the egg received at or above the lower edge 68 so as to exactly position the yolk.

It is to be understood however that this invention is not to be considered as limited to the fact that the under edge 68 be spaced from the plane of the lower edge 18 as above described because the white of an egg will tend to flow first downwardly through the opening 30, whereby if the lower edge 68 be disposed even above the yolk, as the yolk would be positioned after the egg is settled on to a skillet, yet the yolk, having gone through the opening 30 last, will tend to be positioned beneath the opening 30.

Referring to FIGURE 1, it will be seen that the suspending means or portion 50 is provided with a plurality of perforations or windows 80 therethrough, and these are for the purpose of permitting the white of an egg being cooked to be seen to determine whether the egg has as yet been cooked completely.

The suspending means or suspending portion 50 is further provided with upwardly projecting attached hook members 90 which extend first upwardly and then inwardly to define inwardly extending portions 92 which latter are spaced from adjacent portions of the remainder of the suspending portion 50 so as to permit the edge of a spatula to extend under the hook portions 92, whereby the lifting of the shaper is facilitated after the egg has been cooked.

It will be seen that the portions 90 can be economically made in productions by striking them out of a single piece of material, which latter forms all other parts of the shaper as well, to the end that it can be made integrally from a single piece of material, certain strike out holes 94 being struck in the portion 50 from which the hook portions 90 are struck by die during manufacture.

As best seen in FIGURES 1 and 2, the outer annular side wall 16 can be of circular shape if desired, although it can also be of any other shape. For example, one other shape is shown in FIGURE 3, in which an outer side wall 116 is of diamond shape, although in any case it is preferred that the opening 130 corresponding to the opening 30 of FIGURE 2, be of circular shape and that the funnel portion 134 corresponding to the portion 34 of FIGURE 2 be also of circular shape.

Figure 3:
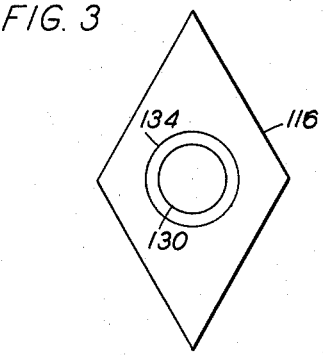
FIGURE 3 is a top plan view of a modification of the shaper of FIGURES 1 and 2 in which the outer wall has a diamond shape, the view of FIGURE 3 is a diagrammatic showing of the modification in a form not as complete as FIGURE 1 although it will be understood that features of the modification of FIGURE 1 can be used with the modification of FIGURE 3.

FIGURE 3 is a diagrammatic view and does not show any other features of FIGURES 1 and 2 such as the hook members 90 and the window openings 80, however, it will be understood that these features can be used with a shaper of any particular outer side wall shape.

In operation it will be seen that the shaper when used as above described will cause eggs to have a predetermined desirable and artistic shape, adding to the novelty of our ways of serving eggs.

It will be bound to be particularly well designed because of its many features such as the window openings 94, spatula receiving hooks 90 and the particular funnel portion 134.

As thus described it is believed that this specification has described an egg shaper which fulfills the objects above set forth.

From the foregoing description, it is thought to be obvious that an egg shaper constructed in accordance with my invention is particularly well-adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

An egg shaping device comprising an annular upwardly extending side wall, having a lower edge of a shape sufficiently close to planar as to retain an egg when the egg is rested on a horizontal flat top of a skillet, a yolk positioning baffle of annular shape for defining a vertical egg receiving hole, said baffle having a first annular portion all sides of which incline downwardly at their inner ends to funnel an egg through said hole, and suspending means connecting said baffle and said annular side wall to suspend said baffle sufficiently spaced above the said lower edge of the outer side wall as to permit an egg being fried to be received under said baffle during use, at least one upwardly projecting attached hook means having an upwardly extending portion attached to the remainder of said device and having a spatula-engaging portion extending to one side of said upwardly extending portion in a position to permit the edge of a spatula to extend thereunder for lifting the shaper by said spatula.

References Cited by the Examiner

UNITED STATES PATENTS

| 1,350,651 | 8/1920 | Hirst | 99—436 |
| 1,925,700 | 9/1933 | Matter | 99—436 |

WALTER A. SCHEEL, *Primary Examiner.*

LAWRENCE CHARLES, JEROME SCHNALL, WILLIAM B. PENN, ROBERT E. PULFREY, *Examiners.*